United States Patent [19]

Knotik et al.

[11] 4,349,412

[45] Sep. 14, 1982

[54] METHOD OF CONCENTRATING AND DRYING WATER-CONTAINING FLUENT MEDIA

[75] Inventors: Karl Knotik, Eisenstadt; Peter Leichter, Vienna; Johann Glock, Ebreichsdorf, all of Austria

[73] Assignee: Österreichische Studiengesellschaft fur Atomenergie Ges.m.b.H., Vienna, Austria

[21] Appl. No.: 970,624

[22] Filed: Dec. 18, 1978

Related U.S. Application Data

[63] Continuation of Ser. No. 779,627, Mar. 21, 1977, abandoned.

[30] Foreign Application Priority Data

Mar. 26, 1976 [AT] Austria ............................ 2237/76

[51] Int. Cl.³ .......................................... C23F 11/08
[52] U.S. Cl. .................................. 159/47 WL; 203/7; 159/DIG. 13; 159/DIG. 20; 252/385; 252/175
[58] Field of Search ................ 159/47 WL, DIG. 13, 159/DIG. 20; 252/385, 301.1 W, 175; 203/7

[56] References Cited

U.S. PATENT DOCUMENTS

| | | | |
|---|---|---|---|
| 1,750,761 | 3/1930 | Martin | 159/DIG. 13 |
| 2,291,146 | 7/1942 | Buist et al. | 159/DIG. 13 |
| 2,979,442 | 4/1961 | Badger | 159/DIG. 13 |
| 3,013,978 | 12/1961 | Rosinski | 252/301.1 W |
| 3,135,670 | 6/1964 | Ristaino et al. | 159/DIG. 13 |
| 3,170,815 | 2/1965 | White | 159/DIG. 13 |
| 3,932,224 | 1/1976 | Hirota et al. | 159/DIG. 13 |

*Primary Examiner*—Norman Yudkoff
*Attorney, Agent, or Firm*—Werner W. Kleeman

[57] ABSTRACT

A method of concentrating and drying water-containing fluent media, especially waste water concentrates, wherein an additive is incorporated in the water-containing fluent media for separating the solids thereof without the formation of scale and the liquid is evaporated. The additive comprises precipitates containing hydroxides, phosphates or arsenates of magnesium, calcium, zinc, aluminum or iron.

10 Claims, No Drawings

METHOD OF CONCENTRATING AND DRYING WATER-CONTAINING FLUENT MEDIA

CROSS-REFERENCE TO RELATED CASE

This application is a continuation of my commonly assigned, copending United States application Ser. No. 779,627, filed Mar. 21, 1977 and now abandoned.

BACKGROUND OF THE INVENTION

The present invention relates to a new and improved method of concentrating and drying aqueous fluent media.

Oftentimes there exists the desire to evaporate to dryness suspensions, solutions, emulsions and the like. This operation is then particularly of interest when the media to be treated contains toxic agents or radioactive wastes. Nuclear power plants produce waste water, which, for instance, contains borates, alkali sulfates, for instance sodium sulfate, alkali silicates, tensides and the like. If such solutions or suspensions are evaporated to dryness, then generally they form scale. Such scale, particularly during continuous concentration and drying, for instance in a thin film rotational evaporator, leads to operating disturbances.

In Austrian Pat. No. 192,382 there is disclosed to the art a method of concentrating sulfite waste liquor or similar calcium sulfate-containing solutions, where there does not occur any scale formation. The formation of scale or incrustations is prevented by the addition of calcium sulfate slurry to the solutions. The calcium sulfate crystals serve as crystallization nuclei, so that there are formed a multiplicity of crystals and no scale is deposited upon the walls. A further refinement of this method has been described in Austrian Pat. No. 206,412, wherein with this disclosed method particular importance is place upon the good formation of the calcium sulfate crystals. Thus, the calcium sulfate crystals, prior to their addition to the solution containing calcium sulfate, are stored in water in order to obtain an orderly crystal formation.

With the above-discussed methods the crystallization nuclei are increased. As the crystallization nuclei there can be generally employed simply crystals which possess the same crystallization form as the substance to be separated out. To practice this method it is thus necessary to know what substance causes the scale formation, and then such substance is introduced in a crystalline state. However, if another substance also causes the formation of scale, then it is necessary to also add this substance in a crystalline state. The procedure needed to practice such prior art method are complicated and only accomplish the intended purpose if there is known the exact composition of the solution which is to be evaporated to dryness. In case of borates these procedures are not however effective, since borates, when they are evaporated to dryness, vitrify and thus form an extreme amount of scale.

SUMMARY OF THE INVENTION

Hence, with the foregoing in mind it is a primary object of the present invention to provide a new and improved method of concentrating and drying aqueous, flowable media, in a manner such that the precipitated solids do not form any scale, and wherein, the additive need not have the same crystallization form as the solids which are to be removed.

DETAILED DESCRIPTION OF THE INVENTION

Now in order to implement these and still further objects of the invention, which will become more readily apparent as the description proceeds, the method of the invention for concentrating and drying water-containing or aqueous, fluent or flowable media, especially waste water concentrates, wherein an additive is introduced for separating the solids free of scale and the liquid is evaporated, essentially resides in the feature of employing as the additive precipitates formed of hydroxides, phosphates or arsenates. Due to these procedures, there is prevented, even in the presence of borates, the formation of scale. Quite to the contrary, there is produced a friable or fluid product, enabling performance of the intended work without any disturbance. Further, there can be obtained a solid with low residual moisture content, so that in the case of radioactive substances there need not be feared any disturbance due to radiolysis of water. Due to the finely particulate structure a further working step can be advantageously carried out, for instance embedding in bitumen.

According to a further aspect of the invention, there have been found to be particularly suitable the hydroxides, phosphates and aresenates of magnesium, calcium, zinc, aluminum or iron.

A particularly advantageous variant of the inventive method resides in producing the hydroxides, phosphates or arsenates in the flowable media. In this way there is eliminated, on the one hand, an unnecessary increase in the volume and, on the other hand, there is obtained a particularly fine distribution of the hydroxides, phosphates or arsenates in the medium, so that with complete evaporation to dryness the solids are present in an extremely particulate form.

There is advantageously maintained a pH greater than 7, especially in the range of 7.5 to 11, so that there can be realized a particularly fine distribution of the precipitates.

In the case of a medium containing borate there are particularly used hydroxides or phosphates of iron or aluminum.

The invention now will be further explained on the basis of a number of examples.

EXAMPLE 1

There was stirred into 100 kg aqueous evaporator concentrate containing 9.6% by weight sodium metaborate, 90 liters of iron chloride solution having a content of 60 g/l iron-III-chloride. Then the pH was adjusted to a value between 7.5 to 9.5 by the addition of sodium hydroxide solution. This suspension was evaporated to dryness in a thin film rotational evaporator. The obtained dry product has a residual moisture below 1% by weight and is pulverulent. No scaling during drying could be observed.

EXAMPLE 2

10 liters iron chloride solution, containing a content of 600 g/l iron-III-chloride were combined with trisodium phosphate solution into a total quantity of 90 liters and precipitation was carried out at a pH of 5.8 to 6.3.

The thus obtained precipitation sludge was admixed by stirring with 100 kg aqueous evaporator concentrate (concentrated solution) containing 9.6% by weight sodium metaborate. Then the pH was adjusted to a value of 7.2 to 8.5 by the addition of phosphoric acid.

This suspension was evaporated to dryness in a thin film rotational evaporator, also referred to in the art as simply a thin film evaporator. The obtained dry product has a residual moisture content below 1% by weight and is pulverulent. Again there could not be observed any scale formation during drying.

EXAMPLE 3

1.4 liters iron chloride solution, containing 600 g/l iron-III-chloride was combined with trisodium phosphate solution, into a total quantity of 15 liters and precipitated at a pH-value of 5.8 to 6.3. The pH was then adjusted by the addition of sodium hydroxide solution to a value greater than 10.5 and the thus obtained precipitate slurry was admixed by stirring with 100 kg aqueous evaporator concentrate containing 20% by weight sodium sulfate. Then, the pH was adjusted by the addition of sulfuric acid to a value of 7.5 to 9.5. This suspension was then evaporated to dryness in a thin film evaporator. The obtained dry product has a residual moisture content below 1% by weight and is pulverulent. Scale formation during drying could not be observed.

EXAMPLE 4

45 liters aluminum nitrate solution with a content of 180 g/l was admixed by stirring with 100 liters evaporator concentrate having a content of washing agent-residues emanating from laundries and corresponding to a solid content of 190 g/l. Then there was formed a precipitate and the pH-value was adjusted to 7.5 to 9.5 by phosphoric acid and/or sodium hydroxide solution. This suspension was evaporated to dryness in a thin film evaporator. The obtained dry product possessed a residual moisture content below 1% by weight and is pulverulent. Scale formation during drying could not be observed.

EXAMPLE 5

25 liters aqueous aluminum chloride solution having a content of 160 g/l was admixed with trisodium phosphate solution into a total quantity of 40 liters and precipitation was carried out at a pH-value of 5.5 to 6.5.

The thus obtained precipitate slurry or sludge was admixed by stirring with 100 kg evaporator concentrate having a content of 9.6% by weight sodium metaborate. Then, the pH was adjusted to a value of 8.0 to 9.5 by the addition of phosphoric acid. This suspension was evaporated to dryness in a thin film evaporator. The obtained dry product had a residual moisture content below 1% by weight and is pulverulent. Scale formation during drying could not be observed.

EXAMPLE 6

100 kg aqueous evaporator concentrate with a content of 5.5% by weight sodium metasilicate and 12% by weight sodium sulfate were admixed with a slurry of 1.2 kg calcium hydroxide in 25 liters of water. Then, the pH was adjusted to a value of 8.5 to 10.0 by the addition of sodium hydroxide solution and/or nitric acid. This suspension was evaporated to dryness in a thin film evaporator. The obtained dry product has a residual moisture content below 1% by weight and is pulverulent. No scale formation during drying could be observed.

EXAMPLE 7

1 kg. aqueous evaporator concentrate having a content of 12% by weight sodium sulfate was admixed with 21 ml magnesium chloride solution having a content of 200 g/l and then precipitated with a Na-arsenate solution until obtaining a pH-value of 6.0 to 6.5. Thereafter, the pH was adjusted to a value of 7.5 to 9.5 by the addition of sodium hydroxide solution. This suspension was evaporated to dryness in a thin film evaporator. The obtained dry product had a residual moisture content below 1% by weight and is pulverulent. Again no scale formation could be observed during drying.

EXAMPLE 8

The evaporator concentrate disclosed in prior Examples 1 to 7 was evaporated to dryness in the same manner but without any additive. In each case there could be observed a pronounced formation of scale and there were formed coherent solid scale deposits.

It is to be recognized that various modifications are possible within the scope of the claimed invention. Having now discussed in considerable detail illustrative and preferred embodiments of the invention, it should be apparent that the objects set forth at the outset of this specification have been satisfied. ACCORDINGLY,

What I claim is:

1. A method of concentrating and drying, using a heat exchange surface, a waste water flowable medium concentrate containing borates which have a tendency to scale said heat exchange surface, comprising the steps:
    adding an additive to the flowable medium containing said borates for the separation of solids contained therein;
    said additive comprising a precipitate formed with at least one member selected from the group consisting of hydroxides, phosphates and arsenates;
    evaporating to dryness the liquid contained in the thus treated flowable medium but without forming scale on the heat exchange surface; and
    recovering the dry solids contained in the flowable medium.
2. The method as defined in claim 1, wherein:
    said precipitate is formed from a member selected from the group consisting of hydroxides, phosphates and arsenates of magnesium, calcium, zinc, aluminum and iron.
3. The process as defined in claim 1, wherein: the precipitate is formed in the flowable medium.
4. The method as defined in claim 1, further including:
    adjusting the pH of the flowable medium containing the additive to be greater than 7.
5. The method as defined in claim 4, wherein:
    the pH is adjusted to be in the range of 7.5 to 11.
6. The method as defined in claim 1, wherein:
    said flowable medium includes dissolved solids capable of forming scale on a heat transfer surface, said method further including the step of causing said dissolved solids to be removed from the solution during precipitation, and thereafter recovering said precipitated solids in a pulverulent state and without the formation of scale on the heat exchange surfaces.
7. A method of concentrating and drying a waste water flowable medium concentrate containing borates, which comprises:
    adding an additive to the flowable medium containing borates for the separation of solids contained therein without the formation of scale;

said additive comprising a precipitate formed with at least one member selected from the group consisting of hydroxides, phosphates and arsenates;

evaporating to dryness the liquid contained in the thus treated flowable medium; and using as the additive a hydroxide compound containing a member selected from the group consisting of iron and aluminum.

8. The method as defined in claim 7, wherein:

said hydroxide compound is formed in the flowable medium.

9. A method of concentrating and drying a waste water flowable medium concentrate containing borates, which comprises:

adding an additive to the flowable medium containing borates for the separation of solids contained therein without the formation of scale;

said additive comprising a precipitate formed with at least one member selected from the group consisting of hydroxides, phosphates and arsenates;

evaporating to dryness the liquid contained in the thus treated flowable medium; and using as said additive a phosphate compound containing a member selected from the group consisting of iron and aluminum.

10. The method as defined in claim 9, wherein:

said phosphate compound is formed in the flowable medium.

* * * * *

UNITED STATES PATENT AND TRADEMARK OFFICE
CERTIFICATE OF CORRECTION

PATENT NO. : 4,349,412
DATED : September 14, 1982
INVENTOR(S) : KARL KNOTIK et al It is certified that error appears in the above-identified patent and that said Letters Patent are hereby corrected as shown below:

On the title page, item [73], after "Austria", insert

--and VEREINIGTE EDELSTAHLWERKE AG (VEW), Vienna, Austria--

Signed and Sealed this

First Day of February 1983

[SEAL]

Attest:

Attesting Officer

GERALD J. MOSSINGHOFF
Commissioner of Patents and Trademarks